(12) United States Patent
Gonze et al.

(10) Patent No.: US 11,065,936 B2
(45) Date of Patent: Jul. 20, 2021

(54) VEHICLE THERMAL SYSTEM ARCHITECTURE

(71) Applicant: GM GLOBAL TECHNOLOGY OPERATIONS LLC, Detroit, MI (US)

(72) Inventors: Eugene V. Gonze, Pinckney, MI (US); Lawrence P. Ziehr, Clarkston, MI (US); Satish P. Ketkar, Troy, MI (US); Michael H. Carlson, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/100,639

(22) Filed: Aug. 10, 2018

(65) Prior Publication Data

US 2020/0047586 A1    Feb. 13, 2020

(51) Int. Cl.
 *B60H 1/00*   (2006.01)
 *B60H 1/32*   (2006.01)
 *B60H 1/14*   (2006.01)

(52) U.S. Cl.
 CPC ..... *B60H 1/00899* (2013.01); *B60H 1/00385* (2013.01); *B60H 1/143* (2013.01); *B60H 1/3227* (2013.01); *B60H 1/00007* (2013.01); *B60H 2001/006* (2013.01); *B60H 2001/00928* (2013.01)

(58) Field of Classification Search
 CPC ............ B60H 1/00899; B60H 1/00385; B60H 1/3227; B60H 1/143; B60H 1/00007; B60H 2001/006; B60H 2001/00928; B60H 1/00278; B60H 2001/00949; B60H 2001/00307; B60H 1/00914; B60H 1/32; B60H 2001/003; B60L 58/26; B60L 58/27; F16H 57/0413; Y02E 60/10; Y02T 10/70
 See application file for complete search history.

(56) References Cited

U.S. PATENT DOCUMENTS

| | | | |
|---|---|---|---|
| 8,371,512 B2* | 2/2013 | Douarre | B60H 1/004 237/2 B |
| 10,118,460 B1* | 11/2018 | Blatchley | H01M 10/625 |
| 10,392,018 B1* | 8/2019 | Rhodes | B60H 1/3208 |
| 10,930,952 B2* | 2/2021 | Watanabe | B60L 50/72 |
| 2008/0087039 A1* | 4/2008 | Reed | B64D 11/04 62/498 |
| 2008/0127666 A1* | 6/2008 | Major | B60H 1/32281 62/244 |

(Continued)

*Primary Examiner* — Ljiljana V. Ciric
(74) *Attorney, Agent, or Firm* — Quinn IP Law

(57) ABSTRACT

A thermal energy management system for a vehicle supplies thermal energy to a passenger compartment of the vehicle. The thermal energy management system includes three thermal fluid loops. The first thermal fluid loop includes a coolant pump for circulating a coolant through at least a vehicle battery, a transmission oil cooler of the vehicle, and a chiller such that the coolant selectively transfers thermal energy from the vehicle battery, the transmission oil cooler, and the chiller. The second thermal fluid loop circulates oil through the transmission oil cooler. The third thermal fluid loop circulates a refrigerant through at least the chiller and at least one condenser such that the third thermal fluid loop transfers thermal energy to the passenger compartment.

20 Claims, 3 Drawing Sheets

(56) References Cited

U.S. PATENT DOCUMENTS

| | | | |
|---|---|---|---|
| 2009/0020620 A1* | 1/2009 | Douarre | B60H 1/00492 237/12.3 R |
| 2010/0064700 A1* | 3/2010 | Ziehr | B60H 1/323 62/84 |
| 2012/0216562 A1* | 8/2012 | Kadle | F28D 9/005 62/434 |
| 2015/0129161 A1* | 5/2015 | Nishikawa | F01P 7/165 165/43 |
| 2015/0202986 A1* | 7/2015 | Hatakeyama | F25B 6/02 165/287 |
| 2015/0217623 A1* | 8/2015 | Hatakeyama | B60L 58/13 165/42 |
| 2015/0258875 A1* | 9/2015 | Enomoto | B60L 3/00 165/104.31 |
| 2015/0291002 A1* | 10/2015 | Smith | B60H 1/00278 165/203 |
| 2016/0129756 A1* | 5/2016 | Enomoto | F25B 49/02 165/202 |
| 2016/0248129 A1* | 8/2016 | Dunham | H01M 10/613 |
| 2016/0339767 A1* | 11/2016 | Enomoto | B60H 1/00278 |
| 2017/0087957 A1* | 3/2017 | Blatchley | B60H 1/00278 |
| 2017/0110775 A1* | 4/2017 | Smith | H01M 10/625 |
| 2017/0295058 A1* | 10/2017 | Gottschalk | H04L 12/2807 |
| 2018/0162377 A1* | 6/2018 | Colavincenzo | B60K 6/24 |
| 2018/0209393 A1* | 7/2018 | Revach | F02N 19/10 |
| 2018/0236842 A1* | 8/2018 | Allgaeuer | B60H 1/00385 |
| 2018/0264913 A1* | 9/2018 | Enomoto | B60L 58/27 |
| 2018/0319246 A1* | 11/2018 | Allgaeuer | B60H 1/143 |
| 2018/0361828 A1* | 12/2018 | Kato | F25B 5/04 |
| 2019/0039434 A1* | 2/2019 | Wallace | B60L 58/27 |
| 2019/0039439 A1* | 2/2019 | Aldridge | H02K 9/19 |
| 2019/0070924 A1* | 3/2019 | Mancini | B60H 1/00278 |
| 2019/0225047 A1* | 7/2019 | Porras | B60H 1/00778 |
| 2019/0226723 A1* | 7/2019 | Heyl | F25B 49/02 |
| 2019/0263223 A1* | 8/2019 | Durrani | B60H 1/32284 |
| 2019/0299791 A1* | 10/2019 | Gonze | B60H 1/00278 |
| 2019/0308489 A1* | 10/2019 | Spies | F25B 6/02 |
| 2019/0366800 A1* | 12/2019 | Durrani | B60H 1/00921 |
| 2020/0009968 A1* | 1/2020 | Lewis | H01M 10/625 |
| 2020/0317026 A1* | 10/2020 | Kitamura | B60H 1/00885 |
| 2020/0324611 A1* | 10/2020 | Yano | B60H 1/00007 |
| 2020/0343601 A1* | 10/2020 | Carlson | H01M 10/625 |
| 2020/0353790 A1* | 11/2020 | Miyoshi | B60H 1/00885 |

* cited by examiner

VEHICLE THERMAL SYSTEM ARCHITECTURE

INTRODUCTION

The statements in this section merely provide background information related to the present disclosure, and may not constitute prior art.

The present disclosure relates to motor vehicle thermal management systems, and more specifically to systems and methods for controlling the operation of thermal energy sources and sinks within a motor vehicle. Emissions standards, environmental concerns, and operator perceptions of responsiveness, smoothness and noise, vibration, and harshness (NVH), as well as operator comfort dictate many of the ways in which thermal energy within a motor vehicle is controlled. Traditionally, efficiencies have been sought within the confines of the internal combustion engines (ICE) functioning as prime movers for motor vehicles. Such advances have generally taken the form of improving combustion efficiency (maximizing combustion energy conversion into motive force), scavenging combustion thermal energy to run heating/ventilation/air conditioning (HVAC) functions, scavenging braking kinetic energy for battery recharging, and the like. The scavenging functions are often performed on dedicated heating, cooling, or electrical circuits, leading to a relatively complex series of circuits, many of which function almost entirely independent of one another.

However, even though ICEs have, and will likely continue to become, more and more efficient, substantial quantities of thermal energy are generated by the ICEs, a significant amount of which is usually rejected to the vehicle's surroundings. That is, in an ICE-powered vehicle, a surplus of thermal energy is generated by the ICE, and cannot be effectively or efficiently contained within the motor vehicle. Thus, a significant amount of so-called "high quality" thermal energy is often rejected from the motor vehicle to the atmosphere. In an attempt to mitigate the inefficient use of ICEs, and to lower emissions, reduce environmental impact, and improve responsiveness, smoothness, NVH, and operator comfort, motor vehicles are increasingly relying upon electrical power for both motivation as well as management of the passenger compartment environment. However, the increasing use of electrical power, as is produced by innovative propulsion systems such as hybrid systems, batteries, fuel cells and the like, has dramatically reduced the amount, and the quality of the thermal energy generated by vehicles equipped with such innovative propulsion systems.

Accordingly, while traditional systems and methods of thermal management originally designed for ICE systems can be applied to innovative propulsion systems such as battery electric vehicles (BEVs)—which rely primarily upon a battery and electric motor-generator for propulsion—the surplus of thermal energy is much smaller than in an ICE system. Therefore, while traditional systems and methods of thermal management can operate for their intended purpose in ICE systems, there is a need for improved systems and methods of thermal management for vehicles in which the use of ICEs is reduced, and/or eliminated entirely. Thus, there is a need for new and improved thermal management systems and methods which efficiently collect, store, and distribute thermal energy to vehicle systems that need such energy, while reducing hardware cost and complexity, improving reliability, and offering improved safety and redundancy, and reduced range anxiety for motor vehicle operators.

SUMMARY

In at least some example approaches, a vehicle is provided that includes a passenger compartment and a thermal energy management system configured to supply thermal energy to the passenger compartment. The thermal energy management system may include three thermal fluid loops. The first thermal fluid loop may include a coolant pump circulating a coolant through at least a vehicle battery, a transmission oil cooler of the vehicle, and a chiller such that the coolant is configured to selectively transfer thermal energy from the vehicle battery, the transmission oil cooler, and the chiller. The second thermal fluid loop may circulate oil through the transmission oil cooler, with the oil circulated about a drive unit of the vehicle to transfer thermal energy from the drive unit via the oil. The third thermal fluid loop may circulate a refrigerant through at least the chiller and at least one condenser such that the third thermal fluid loop is configured to transfer thermal energy to the passenger compartment.

In some examples, the vehicle further comprises at least one of an onboard charging module and an integrated power electronics module, and the first thermal fluid loop circulates the coolant through the at least one of the onboard charging module and the integrated power electronics module. In at least some of these examples, the first thermal fluid loop may be configured to store thermal energy from the at least one of the onboard charging module and the integrated power electronics module. The first thermal fluid loop may, in some of these examples, be configured to supply at least a portion of the stored thermal energy to the passenger compartment via the third thermal fluid loop.

In some examples of a vehicle, the first thermal fluid loop is configured to supply thermal energy to the passenger compartment via the third thermal fluid loop.

The vehicle may, in some approaches, circulate thermal energy generated by the vehicle only via the first, second, and third thermal fluid loops. In other words, the vehicle may utilize the first, second, and third thermal fluid loops exclusively for the active transfer or circulation of thermal energy generated by the vehicle.

Some example vehicles may include an electric motor-generator receiving electric power from the battery, with the motor-generator configured to supply propulsion to the vehicle. In some of these example approaches, the vehicle may be a battery electric vehicle (BEV), a hybrid vehicle, or a fuel cell vehicle.

In some example vehicles, the first thermal fluid loop is a coolant loop, the second thermal fluid loop is an oil loop, and the third thermal fluid loop is a refrigerant loop.

Other examples herein are directed to a thermal energy management system for a vehicle, comprising first, second, and third thermal fluid loops. The first thermal fluid loop may include a coolant pump circulating a coolant through at least a vehicle battery, a transmission oil cooler of the vehicle, and a chiller such that the coolant is configured to selectively transfer thermal energy from the vehicle battery, the transmission oil cooler, and the chiller. The second thermal fluid loop may be configured to circulate oil through the transmission oil cooler, with the oil being circulated about a drive unit of the vehicle to transfer thermal energy from the drive unit via the oil. The third thermal fluid loop may be configured to circulate a refrigerant through at least the chiller and at least one condenser, such that the third thermal fluid loop is configured to transfer thermal energy to a passenger compartment of the vehicle.

In some of the example thermal energy management systems, the first thermal fluid loop is configured to circulate the coolant through at least one of an onboard charging module of the vehicle and an integrated power electronics module of the vehicle. In at least some of these examples, the first thermal fluid loop is configured to store thermal energy from the at least one of the onboard charging module and the integrated power electronics module. In some of these examples, the first thermal fluid loop is configured to supply at least a portion of the stored thermal energy to the passenger compartment via the third thermal fluid loop.

In some examples of a thermal energy management system, the first thermal fluid loop is configured to supply thermal energy to the passenger compartment via the third thermal fluid loop.

In at least some examples, a thermal energy management system for a vehicle is provided, with the thermal energy management system comprising a coolant loop, an oil loop, and a refrigerant loop. The coolant loop may include a coolant pump configured to circulate a coolant through at least a vehicle battery, a transmission oil cooler of the vehicle, and a chiller such that the coolant is configured to selectively transfer thermal energy from the vehicle battery, the transmission oil cooler, and the chiller. The oil loop may be configured to circulate oil through the transmission oil cooler, with the oil circulated about a drive unit of the vehicle to transfer thermal energy from the drive unit via the oil. The refrigerant loop may be configured to circulate a refrigerant through at least the chiller and at least one condenser such that the third thermal fluid loop is configured to transfer thermal energy to a passenger compartment of the vehicle.

In some examples, the coolant loop is configured to circulate the coolant through at least one of an onboard charging module of the vehicle and an integrated power electronics module of the vehicle. The coolant loop, in some of these example approaches, may be configured to store thermal energy from the at least one of the onboard charging module and the integrated power electronics module. In some examples, the coolant loop is configured to supply at least a portion of the stored thermal energy to the passenger compartment via the refrigerant loop.

The coolant loop may, in some examples of a thermal energy management system, be configured to transfer thermal energy to the passenger compartment via the refrigerant loop to heat the passenger compartment continuously and without a freeze purge cycle of the refrigerant loop at ambient temperatures at or below 5 degrees Celsius.

In some examples of a thermal energy management system, the coolant loop is configured to supply thermal energy to the passenger compartment via the refrigerant loop.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Example illustrations herein are directed to a vehicle and thermal energy management system that allow circulation and accumulation of thermal energy to meet various needs of the vehicle, such as heating or cooling of a passenger compartment of the vehicle, or of vehicle components themselves. Example illustrations may circulate thermal energy via a relatively reduced number of thermal fluid loops, thereby simplifying operation of the thermal energy management system, and facilitating storage of otherwise less useful or "low-quality" thermal energy. The storage of this "low-quality" thermal energy in, for example, various heat sinks of the vehicle may allow thermal energy to be reused instead of rejected from the vehicle.

Figure 1:
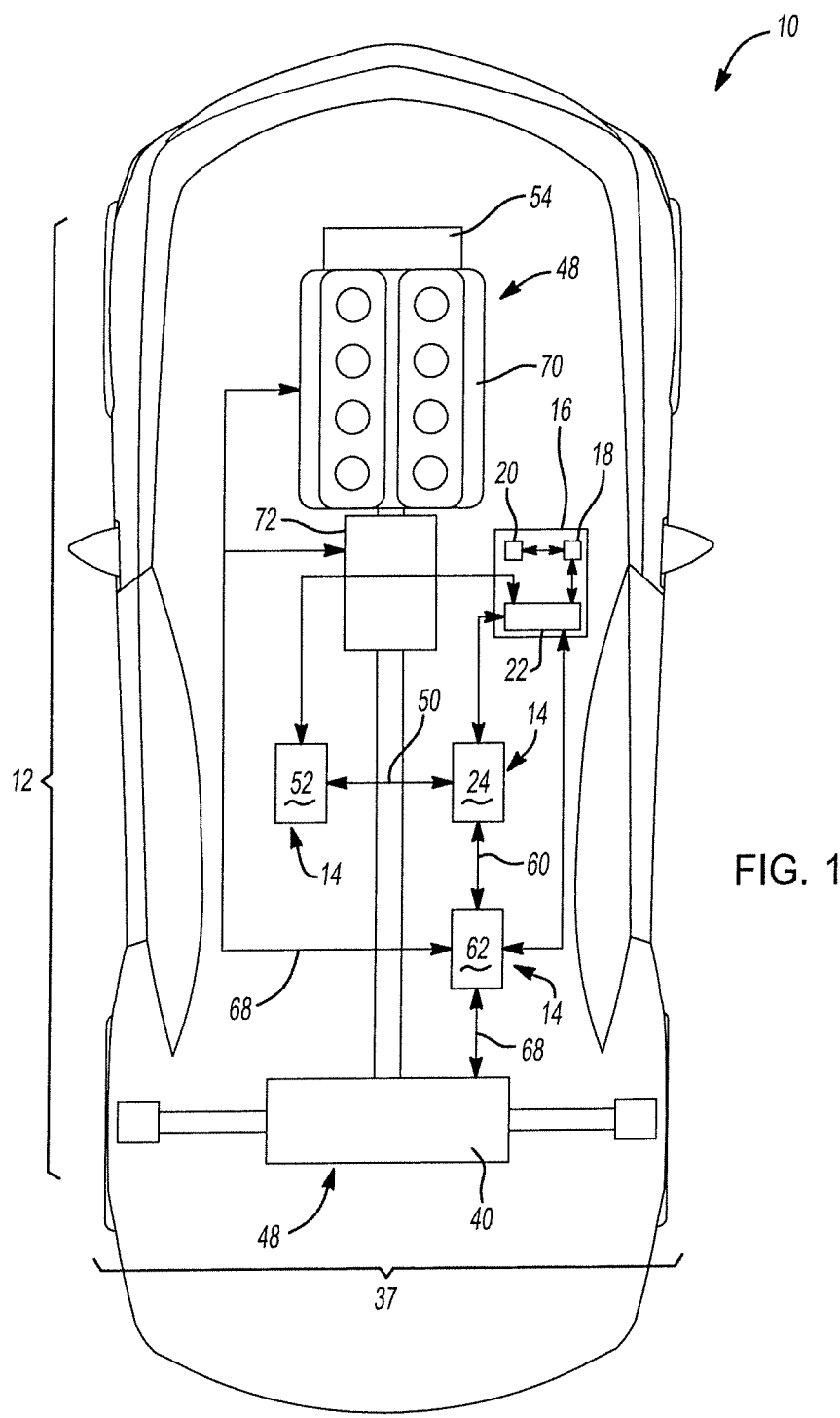
FIG. 1 is an environmental view of a thermal management system for a motor vehicle according to an aspect of the present disclosure.

Referring to FIG. 1, a motor vehicle is shown and indicated generally by reference number 10. While the motor vehicle 10 is depicted as a car, it should be understood that the motor vehicle 10 may be a car, a truck, an SUV, a van, a semi, a tractor, a bus, a go-kart, or any other such motor vehicle 10 without departing from the scope or intent of the present disclosure. The motor vehicle 10 is equipped with a thermal management system 12. In broad terms, the thermal management system 12 operates to selectively transport thermal energy from a heat source within the thermal management system 12 to a heat sink in the thermal management system 12, or from a heat source or a heat sink to a location within the thermal management system 12 where the thermal energy is needed. The thermal management system 12 includes a plurality of dissimilar thermal fluid loops 14 for various motor vehicle 10 sub-systems. Each of the dissimilar thermal fluid loops 14 has heat sources and heat sinks associated with one or more of the motor vehicle 10 sub-systems. However, some heat sinks are significantly more massive, and therefore, capable of storing more thermal energy, than other heat sinks. Accordingly, depending on the thermal energy storage capacities of various heat sinks within the thermal management system 12, thermal energy may be moved from one of the dissimilar thermal fluid loops 14 to another.

As noted above, the vehicle 10 may circulate or transfer thermal energy via a reduced number of thermal fluid loops 14 in comparison to previous approaches. In the example illustrated in FIGS. 1-4, the vehicle 10 circulates thermal energy generated onboard the vehicle only via the three fluid loops 14. In other words, the thermal requirements for the vehicle 10, i.e., any needs for heating or cooling of vehicle 10 components, as well as heating or cooling of the passenger compartment, may be met using only the three thermal fluid loops 14. Thermal energy may be transferred via the thermal fluid loops 14 by way of conduction, convection, or any other heat transfer mechanism that is convenient.

A controller 16 in electronic communication with a plurality of actuators, valves, and the like manages the operation of the thermal management system 12, including the plurality of dissimilar thermal fluid loops 14. The controller 16 is a non-generalized, electronic control device having a preprogrammed digital computer or processor 18, a memory or non-transitory computer readable medium 20 used to store data such as control logic, instructions, lookup tables, etc., and a plurality of input/output peripherals or ports 22. The processor 18 is configured to execute the control logic or instructions. The controller 16 may have additional processors or additional integrated circuits in communication with the processor 18 such as logic circuits for analyzing thermal management data. In some examples, the controller 16 may be better described as a plurality of controllers 16, each of which is designed to interface with and manage specific componentry within the motor vehicle 10, and each of the plurality of controllers 16 is in electronic communication with the others. However, while in some examples more than one controller 16 may be used, for ease of understanding, the following description will focus on a thermal management system 12 having only a single controller 16.

Figure 2:
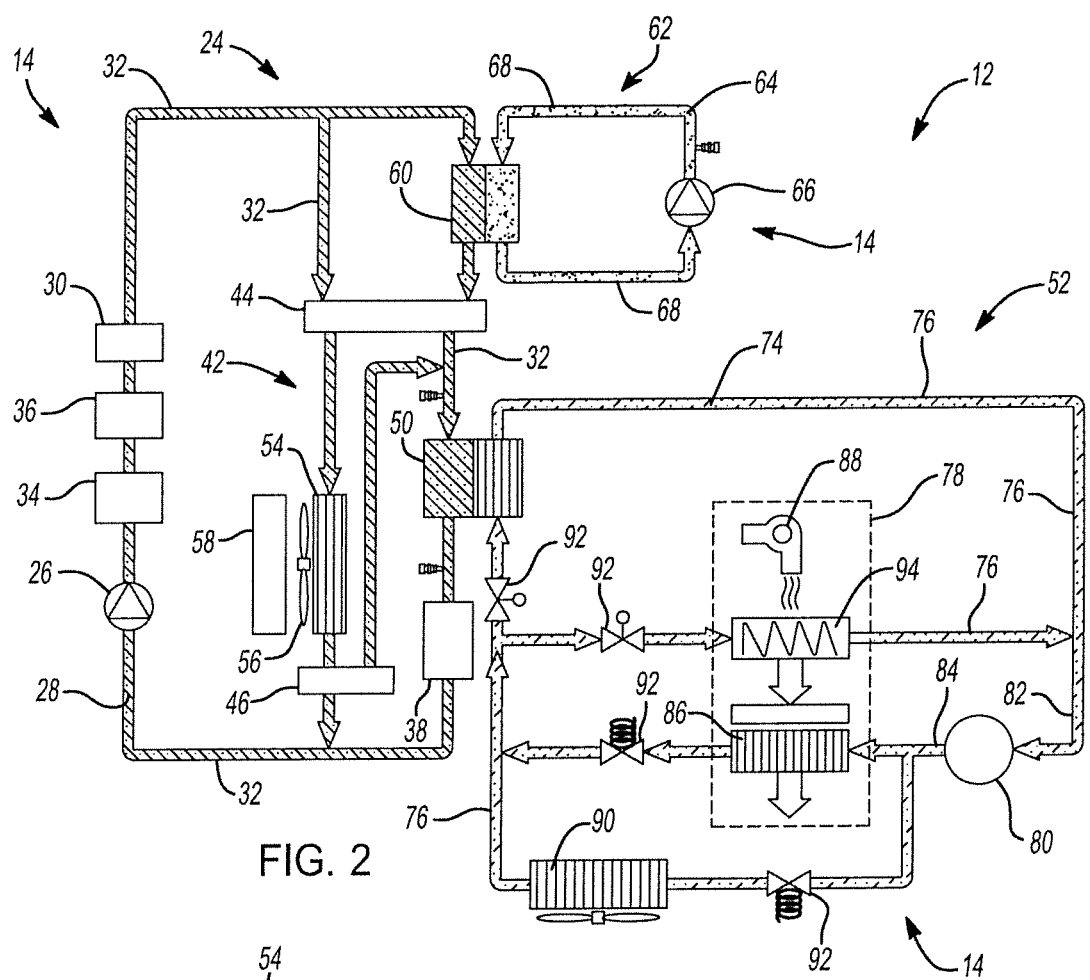
FIG. 2 is a system diagram depicting a thermal management system for a motor vehicle according to an aspect of the present disclosure.

Referring now to FIG. 2 and with continuing reference to FIG. 1, a first of the dissimilar thermal fluid loops 14 is a coolant loop 24. The coolant loop 24 includes a coolant pump 26 selectively pumping coolant 28 through a plurality of coolant conduits 32. The coolant conduits 32 are in fluid communication with a variety of coolant loop 24 components. In some aspects, the coolant loop 24 components include an integrated power electronics (IPE) module 34. The IPE 34 is an electronic device having a variety of accessories usable by the motor vehicle operator. In some instances, the IPE 34 includes one or more of an AC/DC converter (not shown), a high voltage supply (not shown), a navigation system (not shown), a high voltage charger (not shown), a heated seat system (not shown), and/or other like devices and features. As the IPE 34 is operated, the electronics within the IPE 34 convert electrical energy into a variety of functions usable by the motor vehicle operator. In addition, thermal energy is generated as a byproduct of using electrical energy within the IPE 34 devices. The coolant 28 carries the thermal energy from the IPE 34 devices elsewhere in the coolant loop 24.

As will be discussed further below, thermal energy from the IPE 34 devices may not be significant in output, and in this sense be relatively "low-quality" in comparison to sources such as an internal combustion engine. Nevertheless, as will be described further below, the thermal energy management system 12 may facilitate accumulation of such low-quality thermal energy, allowing it to be subsequently deployed to the passenger compartment or elsewhere in the vehicle 10 in a manner consistent with previous approaches using "high-quality" thermal energy sources such as internal combustion engines. Thus, despite the reduction in usage or elimination of the ICE from the vehicle 10, the thermal energy management system 12 may nevertheless have sufficient heating output.

The coolant loop 24 further includes an onboard charging module (OBCM) 36 for a battery 38. The OBCM 36 is an electrical device designed to move energy into a secondary cell or rechargeable battery 38 by forcing an electrical current through the battery 38. In some examples, a single-phase 3.5 kW to 22 kW OBCM 36 is installed within the electrical system of the motor vehicle 10 and charges the motor vehicle 10 battery 38 from a power grid. In other examples, the battery 38 of the motor vehicle 10 can be used as an energy source, and therefore, the OBCM 36 can also direct electrical energy to the electrical grid, or to accessory or ancillary devices within the motor vehicle 10. In addition, the OBCM 36 can also direct electrical energy to devices, such as cellular phones, and the like that an operator of the motor vehicle 10 may power from electrical connections within the IPE 34 of the motor vehicle 10. Thus, in some instances, the OBCM 36 is a bi-directional battery 38 charging and discharging device. In many instances, the battery 38 is most efficiently charged when the battery 38 is heated to a predetermined target temperature. In one aspect, the predetermined target temperature is approximately 25° Celsius. However, depending on the componentry and the thermal requirements of the thermal management system 12 components, the predetermined target temperature of the battery 38 may vary. In one example, to achieve the target temperature range, the battery 38 can be heated electrically via electrical energy supplied by the OBCM 36. In the example, the controller 16 effectively overdrives the OBCM 36 or drives the OBCM 36 in a calculatedly inefficient manner so as to convert a predetermined amount of electrical energy into thermal energy, e.g., to raise the temperature of the battery 38. In another example, the battery 38 itself is charged in a calculatedly inefficient manner. That is, the battery 38 is charged inefficiently so that a portion of the electrical energy being driven into the battery 38 by the OBCM 36 is converted into thermal energy which is then stored within the mass of the battery 38 while the battery 38 is being charged. In yet another example, thermal energy is directed to the battery 38 via coolant 28 carried by the coolant loop 24 from other heat sources within and external to the coolant loop 24. In some examples, the coolant loop 24 includes a coolant heater 30. The coolant heater 30 is an electrically-powered heater that adds thermal energy to the flow of coolant 28, thereby aiding in bringing the battery 38 up to an optimal charging temperature. In some examples, once the battery 38 has been electrically charged sufficiently, and charged sufficiently with thermal energy the temperature of the battery 38 is regulated by the OBCM 36.

In some aspects, a motor vehicle 10 braking system 37 includes a regeneration function. In motor vehicles 10 having regenerative braking systems, an electric motor 40 is used as an electric generator. Electricity generated by the electric motor 40 is fed back into the battery 38 by the OBCM 36. In some battery electric and hybrid vehicles, the energy is also stored in a bank of capacitors (not shown), or mechanically in a rotating flywheel (not shown). Under circumstances when the controller 16 and OBCM 36 determine that the battery 38 is fully charged or additional heating is otherwise desired, the electricity generated by the electric motor 40 can be converted into thermal energy and stored in the mass of the battery 38 or other thermal management system 12 components.

Figure 3:
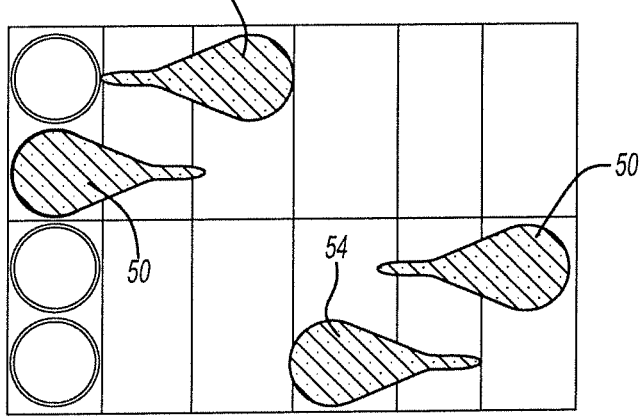
FIG. 3 is a first valve diagram depicting opening and closing states for a plurality of valves within a thermal management system for a motor vehicle according to an aspect of the present disclosure.
Figure 4:
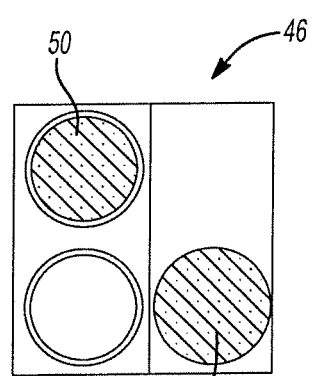
FIG. 4 is a second valve diagram depicting opening and closing states for a valve within a thermal management system for a motor vehicle according to an aspect of the present disclosure.

Referring now to FIGS. 3 and 4, and with continuing reference to FIGS. 1 and 2, to maintain optimal battery 38 temperature, in some examples, the coolant loop 24 further includes a battery bypass 42. In general terms, the battery bypass 42 is operable to selectively provide coolant 28 flow through the battery 38 or to bypass the battery 38 under a predetermined set of conditions. For example, the battery bypass 42 is set in a closed position when temperature of the battery 38 is below the optimal battery 38 temperature. In the example, coolant 28 flows through the battery 38 and imparts thermal energy to the battery 38 from the OBCM 36, the coolant heater 30 and other thermal management system 12 components. In a second example, the battery bypass 42 is set in an open position when the battery temperature is above the optimal battery 38 temperature. In the second example, coolant 28 flow is directed away from the battery 38. The controller 16 manages the flow of coolant 28 through the battery bypass 42 by way of at least a first bypass valve 44 and a second bypass valve 46. The first bypass valve 44 operates to selectively direct the flow of coolant 28 past a second of the dissimilar thermal fluid loops 14, namely around a drive unit 48 disposed in a drive unit oil loop 62. The drive unit 48 provides torque to move the motor vehicle 10, and will be described in more detail below. The second bypass valve 46 operates to selectively direct the flow of coolant 28 around a third of the dissimilar thermal fluid loops 14, namely around a chiller 50 of a refrigerant loop 52. Depending on the requirements of the thermal management system 12, the first and second bypass valves 44, 46 may be variable force solenoids (VFS) or valves, variable bleed solenoids (VBS) or valves, or binary or mode control solenoids or valves, merely as examples.

In the example of FIG. 3, the first bypass valve 44 is of the VFS or VBS type. Thus, the first bypass valve 44 is configured to be varied along a continuous spectrum between a fully closed state and opened state. In the fully closed state, the first bypass valve 44 prevents all coolant 28 flow incident upon an inlet of the first bypass valve 44 from flowing through the first bypass valve 44 to an outlet of the first bypass valve 44. By contrast, in the fully opened state, the first bypass valve 44 will provide all coolant 28 flow incident upon the inlet of the first bypass valve 44 to the outlet of the first bypass valve 44. The first bypass valve 44 should be understood to vary the valve opening in accordance with the coolant 28 flow demands of the thermal management system 12.

In FIG. 3, the upper half of the valve diagram depicts a situation in which the drive unit 48 is receiving thermal energy from the coolant 28 via a heat exchange device, such as a transmission oil cooler (TOC) 60. The upper half of the valve diagram shows that the first bypass valve 44 is providing a variable amount of flow through the radiator 54 and the chiller 50 while also providing coolant 28 to the TOC 60. In the bottom half of the valve diagram in FIG. 3, the valve diagram shows a situation in which the first bypass valve 44 is shunting coolant 28 away from the TOC 60, thereby bypassing heat exchange with the drive unit oil loop 62 entirely. However, the first bypass valve 44 still provides variable flow through the radiator 54 and the chiller 50.

In the example of FIG. 4, the second bypass valve 46 is of the binary or mode control variety. That is, the second bypass valve 46 is a binary valve having only fully open and fully closed states. In the fully closed state, the second bypass valve 46 prevents all coolant 28 flow incident upon an inlet of the second bypass valve 46 from flowing through the second bypass valve 46 of an outlet of the second bypass valve 46. By contrast, in the fully opened state, the second bypass valve 46 will provide all coolant 28 flow incident upon the inlet of the second bypass valve 46 to the outlet of the second bypass valve 46. The second bypass valve 46 should be understood to operate in open or closed states in accordance with the coolant 28 flow demands of the thermal management system 12. In the upper half of the valve diagram of FIG. 4, the second bypass valve 46 of FIG. 4 is depicted in a closed state in which coolant 28 flow is provided to the chiller 50. In the bottom half of the valve diagram of FIG. 4, in the open state, the second bypass valve 46 directs coolant 28 to bypass the chiller 50 and the battery 38 as well, thereby forming part of the battery bypass 42. Thus, when the second bypass valve 46 is open, coolant 28 flows from the second bypass valve 46 directly into the coolant conduits 32 leading to the coolant pump 26.

In some examples, the first and second bypass valves 44, 46 selectively direct the flow of coolant 28 through a radiator 54. The radiator 54 exchanges thermal energy between the coolant 28 and the atmosphere external to the motor vehicle 10. Thus, when the radiator 54 is used, thermal energy is rejected from the motor vehicle 10. In some examples, the radiator 54 operates in conjunction with a fan 56 and an airflow management device, such as a shutter mechanism 58 operable to precisely regulate the temperature of the radiator 54, and therefore, the coolant 28 passing through the radiator 54. In some aspects, the shutter mechanism 58 is a series of vanes or flaps disposed in an orifice (not shown) on an exterior surface of the motor vehicle 10, such as a front, side, underside or top-side-facing air intake (not shown), or an intake disposed within a foglight housing (not shown), or the like. The vanes or flaps of the shutter mechanism 58 are moved through a range of motion that provides at least an open position and a closed position. In several aspects, the controller 16 can alter the position of the shutter mechanism 58 electromechanically by way of solenoids, motors, actuators, and the like, hydraulically, by aerodynamic forces, or any combination of the above. In the open position, airflow incident upon the shutter mechanism 58 is allowed to pass through the shutter mechanism 58 and towards the radiator 54 and/or the fan 56. In the closed position, airflow incident upon the shutter mechanism 58 is prevented from passing through to the radiator 54 and/or the fan 56. While shutter mechanism 58 has been described herein as having open and closed positions, it should be understood that the shutter mechanism 58 may be manipulated into any position between fully open and fully closed as well. Thus, the controller 16 can manipulated the shutter mechanism 58 precisely to provide and modulate airflow to the radiator 54 when such airflow is desirable, and to prevent such airflow when no airflow is needed. In some examples, the controller 16 commands the shutter mechanism 58 to remain closed under a wide range of drive cycle conditions, thereby minimizing thermal energy rejection to atmosphere via the radiator 54.

In further examples, the first and second bypass valves 44, 46 variably direct the flow of coolant 28 through both the battery 38 and the radiator 54, as shown in FIG. 3, thereby providing the coolant loop 24 with the ability to precisely thermoregulate the battery 38 and other components within the coolant loop 24.

The first bypass valve 44 selectively directs coolant 28 flow through the battery 38 and/or through a transmission oil cooler (TOC) 60 disposed in the second of the dissimilar thermal fluid loops 14, namely, the drive unit oil loop 62. The TOC 60 is a heat exchange device providing a means of thermal energy transfer between the coolant loop 24 and the drive unit oil loop 62. The TOC 60 includes at least two passageways physically separated from one another. That is, on a first side of the TOC 60, a coolant 28 passageway (not shown) carries coolant 28 through the TOC 60 as a part of the coolant loop 24. On a second side of the TOC 60, an oil passageway (not shown) carries oil 64 through the TOC 60 as a part of the drive unit oil loop 62. However, it should be understood that despite the fact that the TOC 60 includes both a portion of the coolant loop 24 and the oil loop 62, there is no fluid interface between coolant 28 and oil 64 within the TOC 60, and thus the coolant 28 and oil 64 are prevented from mixing.

An oil pump 66 pumps the lubricating oil 64 through a plurality of oil conduits 68 in fluid communication with a drive unit 48. The drive unit 48 is a plurality of mechanical devices that convert chemical or electrical energy into torque to motivate the motor vehicle 10. In several aspects, the mechanical devices include an engine 70 and a transmission 72. The engine 70 may be an internal combustion engine (ICE), an electric motor 40, and/or any other type of prime mover without departing from the scope or intent of the present disclosure. In some aspects, the engine 70 operates in conjunction with, or may be replaced entirely by at least one electric motor 40. The engine 70 and/or electric motor 40 provides torque that moves the motor vehicle 10 via a transmission 72. The transmission 72 may be a manual, automatic, multi-clutch, or continuously variable transmission, or any other type of electronically, pneumatically, and/or hydraulically-controlled automotive transmission 72 without departing from the scope or intent of the present disclosure. The transmission 72 is mechanically and/or fluidly coupled to the engine 70. The drive unit oil loop 62 circulates the oil 64 throughout the transmission 72, thereby keeping the internal components of the transmission 72 lubricated. In some aspects, the transmission 72 and the engine 70 share a supply of oil 64 via the oil loop 62. Moreover, in some examples, the circulating oil 64 is used to heat or warm the transmission 72 during engine 70 startup or cool the transmission 72 as necessary during heavy use. The drive unit 48 has a predetermined optimal operating temperature at which the lubricating oil 64 has desirable viscosity and lubrication characteristics. In several aspects, the predetermined optimal operating temperature is approximately 70° Celsius. However, depending on the application and the components of the drive unit 48 and in the drive unit oil loop 62, the optimal operating temperature may vary substantially. For example, in drive units 48 having an internal combustion engine 70, the optimal oil 64 temperature circulating through the engine 70 between about 85° Celsius and about 120° Celsius. In another example, in drive units 48 having an automatic transmission 72, the optimal temperature of the oil 64 circulating through the automatic transmission 72 may be between about 20° Celsius and about 110° Celsius. In still another example, in drive units 48 having an automatic transmission 72 coupled to a torque converter (not shown), the temperature of oil 64 circulating through the torque converter may be between about 90° and about 180° Celsius.

Referring once more to FIG. 4 and with continuing reference to FIGS. 1-3, the second bypass valve 46 selectively directs coolant 28 flow through the battery 38 and/or through a chiller 50 disposed in the third of the dissimilar thermal fluid loops 14, in particular, a refrigerant loop 52. The chiller 50 is a heat exchange device providing a means of thermal energy transfer between the coolant loop 24 and the refrigerant loop 52. However, like the TOC 60, the chiller 50 includes at least two passageways physically separated from one another. That is, on a first side of the chiller 50, a coolant 28 passageway (not shown) carries coolant 28 through the chiller 50 as a part of the coolant loop 24. On a second side of the chiller 50, a refrigerant passageway (not shown) carries a refrigerant 74 through the chiller 50 as a part of the refrigerant loop 52. However, it should be understood that despite the fact that the chiller 50 includes both a portion of the coolant loop 24 and the refrigerant loop 52, there is no fluid interface between coolant 28 and refrigerant 74 within the chiller 50, and thus the coolant 28 and refrigerant 74 are prevented from mixing.

The refrigerant loop 52 includes a plurality of refrigerant conduits 76 fluidly connecting a plurality of devices operable to thermally regulate a passenger compartment (not specifically shown) contained within the motor vehicle 10. The passenger compartment may be thermally isolated from other vehicle components generating heat, and may receive flows of thermal energy via one or more vents or other conduits (not specifically shown) of the HVAC system 78. The refrigerant loop 52 also carries thermal energy to and from the coolant loop 24 via the chiller 50. The refrigerant loop 52 includes a variety of operator comfort systems such as a heating, ventilation, and air conditioning (HVAC) system 78. Fundamentally, the refrigerant loop 52 has a heating function and a cooling function. Within the refrigerant loop 52, the HVAC system 78 provides heated and/or cooled air to a passenger compartment of the motor vehicle 10. Stated another way, the HVAC system 78 transports thermal energy from a cooler location to a warmer location within the refrigerant loop 52. In several aspects, the HVAC system 78 functions as a heat pump. That is, the HVAC system 78 is an air conditioner in which both heating and cooling functions are possible.

In one example, the operator of the motor vehicle 10 determines a desired passenger compartment air temperature and selects a heating cycle for the HVAC system 78. The HVAC system 78 includes a compressor 80. The refrigerant 74 enters the compressor 80 via a refrigerant conduit 76 known as a suction line 82. The compressor 80 compresses gaseous refrigerant 74, thereby increasing the temperature and pressure of the refrigerant 74. The now high-pressure, high-temperature refrigerant 74 then leaves the compressor 80 via a refrigerant conduit 76 known as a discharge line 84 and flows into a cabin condenser 86. In some aspects, the cabin condenser 86 is a heat exchange device having a plurality of condenser coils through which the refrigerant 74 flows. The coils are in contact with the passenger compartment atmosphere. An HVAC blower or fan 88 blows air over the cabin condenser 86, thereby releasing thermal energy from the condenser 86 into the passenger compartment atmosphere. In some aspects, the refrigerant loop 52 includes a second or exterior condenser 90. The exterior condenser 90 is in contact with the atmosphere external to the motor vehicle 10 and when engaged, releases thermal energy from the refrigerant 74 from the motor vehicle 10 to the atmosphere.

The HVAC system 78 further includes a plurality of expansion valves 92. Depending on the HVAC system 78 design parameters, the expansion valves 92 may be mechanical thermostatic expansion valves (TXV) (not specifically shown) and/or electronic expansion valves (EXV) (not specifically shown). Control over the rate of refrigerant 74 expansion can be more directly and precisely controlled with EXVs than with TXVs, however in some cases it is desirable to use TXVs for reasons of cost, simplicity, and so forth. Condensed, pressurized, and still somewhat warm refrigerant 74 received from the cabin condenser 86 and/or exterior condenser 90 is routed through an expansion valve 92. As the refrigerant 74 is de-pressurized by the expansion valve 92, the refrigerant 74 cools. The refrigerant 74 then passes through an evaporator 94. The evaporator 94 is a heat exchange device in which a series of refrigerator coils (not shown) carry a flow of cooled refrigerant 74. The refrigerator coils exchange thermal energy with the passenger compartment atmosphere. The HVAC blower or fan 88 blows air over the cabin evaporator 94 thereby cooling the passenger compartment of the motor vehicle 10. The refrigerant 74, having passed through the evaporator 94 is then directed back through the compressor 80. Refrigerant 74 is also selectively passed through an expansion valve 92 to the chiller 50 where thermal energy is either obtained from or released to the coolant loop 24, depending on the relative temperatures of the coolant 28 and the refrigerant 74, and the thermal requirements of the battery 38 and other thermal management system 12 componentry.

In one example, the HVAC system 78 can be operated intermittently or continuously by occupants in the passenger compartment, or by the controller 16 depending on optimal heating and/or cooling requirements of the passenger compartment, or optimal heating and/or cooling requirements of other thermal management system 12 components. In one example, the HVAC system 78 operates continuously as a heat pump. As previously discussed, while operating as a heat pump, the HVAC system 78 directs refrigerant 74 through the cabin condenser 86, thereby rejecting the thermal energy in the refrigerant 74 to the passenger compartment and cooling the refrigerant 74. However, because the refrigerant loop 52 exchanges thermal energy with the coolant loop 24 in the chiller 50, a temperature of the refrigerant 74 in the refrigerant loop 52 remains substantially above the freezing point of water. That is, the refrigerant 74 continuously exchanges thermal energy with the coolant 28, and with oil 64 in the oil loop 62 via the coolant 28 in the coolant loop 24. Therefore, while refrigerant 74 passing through the cabin condenser 86 and the exterior condenser 90 rejects thermal energy, and is thereby cooled, thermal energy is also obtained as the refrigerant 74 passes through the chiller 50. Thus, because the temperature of the refrigerant 74 remains substantially above the freezing point of water, the cabin condenser 86 remains substantially free of ice accumulation. Similarly, in a second example, the controller 16 directs refrigerant 74 through the exterior condenser 90 where the refrigerant 74 is cooled by rejecting thermal energy to the atmosphere, but because the refrigerant 74 also flows through the chiller 50, a temperature of the refrigerant 74 remains substantially above the freezing point of water. Therefore, in both the first and second examples, ice is prevented from forming on both the cabin and exterior condensers 86, 90 even if one, the other, or both the cabin and exterior condensers 86, 90 are used continuously. Moreover, even if ice does begin to accumulate on the cabin and exterior condensers 86, 90, the controller 16 directs thermal energy from one of the thermal energy reservoirs in the oil loop 62 or the coolant loop 24 to the chiller 50, and using the expansion valves 92, through the interior and/or exterior condensers 86, 90, thereby melting any accumulation of ice as needed.

Figure 5:
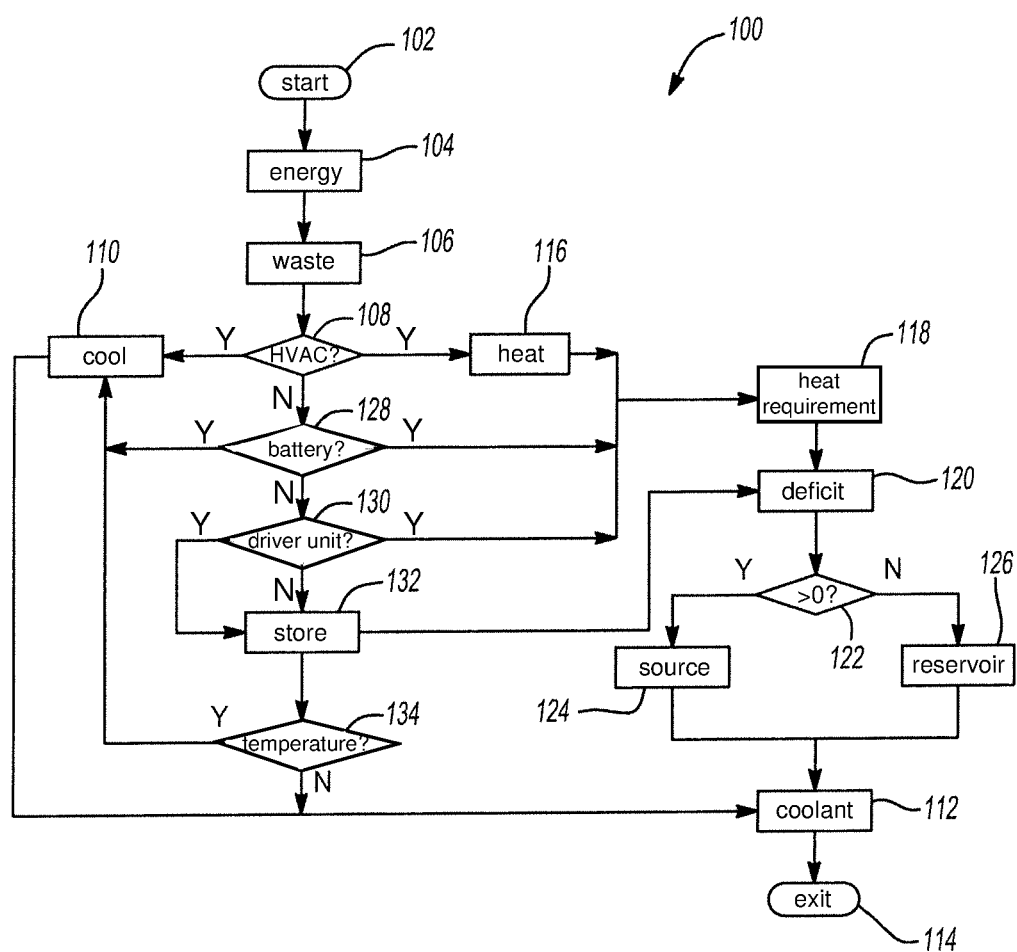
FIG. 5 is a flow diagram depicting a method of controlling a thermal management system for a motor vehicle according to an aspect of the present disclosure.

Turning now to FIG. 5, a thermal management method 100 for controlling the functionality of the thermal management system 12 is shown in flowchart form. In general terms, the controller 16 manages the functions of the coolant loop 24, the drive unit oil loop 62 and the refrigerant loop 52 via the TOC 60 and the chiller 50 to transfer thermal energy to devices within the motor vehicle 10 where the thermal energy is needed. Additionally, the controller 16 directs the storage of thermal energy in various components of the dissimilar thermal fluid loops 14 depending on the needs of the thermal management system 12.

The thermal management method 100 begins at block 102 where a continuous thermal management system 12 control loop is initiated. The method proceeds to block 104 where the controller 16 calculates a stored energy in the thermal management system 12. In general terms, the stored energy is a sum of energy stored in the battery 38, energy stored in the drive unit 48, and energy stored in other componentry of the motor vehicle 10 (e.g. a sum of the energy stored in the refrigerant loop 52, IPE 34, and the like). In more specific terms, the energy stored in the battery 38 may be a measure of the heat capacity of the battery 38 multiplied by the temperature of the battery 38 subtracted from the temperature of the coolant 28. The drive unit 48 energy, in an example, is the heat capacity of the drive unit 48 multiplied by the temperature of the oil 64 subtracted from the temperature of the coolant 28. The energy stored in other componentry of the motor vehicle 10 may be a function of the sum of the heat capacities of the various components multiplied by the fluid temperature in the relevant one of the dissimilar thermal fluid loops 14 subtracted from the temperature of the coolant 28.

The method 100 then proceeds to block 106 where the controller 16 calculates a system waste heat. The system waste heat is a sum of excess thermal energy in each component of the thermal management system 12. The method then proceeds to block 108 where the controller 16 determines whether an HVAC system 78 request has been made. The HVAC system 78 request made at block 108 can be in the form of a "heat" request or a "cool" request. When the HVAC system 78 request is a "cool" request, the thermal management system 12 operates as a heat pump to cool the passenger compartment at block 110. At block 112, the controller 16 calculates a coolant 28 flow as a function of the quantity of thermal energy in the coolant 28, the battery 38, the HVAC system 78, and electronic heating apparatuses, such as wall chargers for the motor vehicle 10 and the like operated by the OBCM 36. At block 114, the thermal management method 100 exits and returns to block 102 where the continuous thermal management loop begins once more.

When the HVAC system 78 request is a "heat" request, the method 100 proceeds to block 116 where the controller 16 operates the thermal management system 12 as a heat pump to heat the passenger compartment. At block 118, the controller 16 calculates a thermal management system 12 heat requirement. The thermal management system heat 12 heat requirement is a sum of the heat pump heat required, the battery 38 heat required, and the drive unit 48 heat required. At block 120, the controller 16 calculates a heat deficit based on the thermal management system 12 heat required subtracted from the sum of recoverable stored heat energy and system waste heat. At block 122, the controller 16 determines whether the heat deficit from block 120 is greater than zero. At block 124 if the heat deficit is greater than zero, the battery 38 operates to provide thermal energy to the thermal management system 12. That is, the battery 38 releases thermal energy stored in the mass of the battery 38 into the coolant 28, thereby moving thermal energy from a source (the battery 38) to the appropriate sink (in this case, the HVAC system 78). In another example, the controller 16 can command the battery 38 to provide electrical energy to a thermal energy generator, such as the cabin condenser 86. In still another example, the controller 16 commands all high-voltage devices in the thermal management system 12, such as the coolant heater 30, IPE 34, OBCM 36, and battery 38, to operate inefficiently, thereby producing thermal energy as a byproduct of electrical energy usage and provide the thermal energy to the appropriate thermal energy sink via the coolant 28. In yet another example, the controller 16 commands OBCM 36 to convert electrical energy from the regenerative braking system 37 to thermal energy. In some aspects, to convert electrical energy from the regenerative braking system 37 into thermal energy, the electric motor 40 is operated inefficiently. That is, in some circumstances, the electric motor 40 provides drag against a torque provided by the engine 70, thereby causing both the engine 70 and the electric motor 40 to generate thermal energy as a byproduct of operation. The thermal energy is then collected by circulating coolant 28 and distributed to locations where the thermal energy is needed. At block 126, if the heat deficit is not greater than zero, the battery 38 remains a thermal and electrical energy reservoir and the controller 16 does not command the battery 38 to release energy to the thermal management system 12 for heating purposes. After either block 124 or block 126, the method 100 proceeds to block 112, then to block 114, and subsequently to block 102 where the continuous thermal management loop begins once more.

Referring once more to block 108, the HVAC system 78 does not always make a request. Therefore, when no such request is made, the thermal management method 100 proceeds to block 128 where the controller 16 determines if a battery 38 request has been made. Like the HVAC system 78 requests, the battery request can be in the form of a "heat" or a "cool" or no request at all. In the case of a "cool" request, the thermal management method 100 proceeds to block 110 where the controller 16 operates the thermal management system 12 as a heat pump to cool the battery 38. That is, the controller 16 operates the thermal management system 12 to evacuate thermal energy from the battery 38 via the coolant 28, thereby moving the thermal energy to other locations within the thermal management system 12 where the thermal energy is needed. At block 112, the controller 16 calculates a coolant 28 flow as a function of the quantity of thermal energy in the coolant 28, the battery 38, the HVAC system 78, and electronic heating apparatuses, such as wall chargers for the motor vehicle 10 and the like operated by the OBCM 36. At block 114, the thermal management method 100 exits and returns to block 102 where the continuous thermal management loop begins once more.

When the battery 38 request is a "heat" request, as with the HVAC system 78 heat request, the thermal management method 100 proceeds to block 116 where the controller 16 operates the thermal management system 12 as a heat pump to collect thermal energy from thermal energy sources and reservoirs within the thermal management system 12 and transfer the thermal energy to the battery 38. The thermal management method 100 then proceeds to block 118, 120, 122, and 124 or 126, then 112 and 114 as in example of the HVAC system 78 heat request above. Referring once more to block 128, the battery 38 does not always make a request. Therefore, when no request is made, the thermal management method 100 proceeds to block 130 where the controller 16 determines if a drive unit 48 request has been made.

As with the HVAC system 78 and battery 38 above, the drive unit 48 request can be in the form of a "heat" or a "cool" request, or no request at all. When the controller 16 determines that a "cool" request has been made, the method 100 proceeds to block 132 where the controller 16 commands the thermal management system 12 to store thermal energy in any of a variety of thermal energy reservoirs in the thermal management system 12. The thermal energy reservoirs can be any of the components of the coolant loop 24, the drive unit oil loop 62, or the refrigerant loop 52. In some aspects, the more mass that a thermal energy reservoir has, the more thermal energy the reservoir can store. However, the composition, density, surface area, insulation, and other physical characteristics of the thermal energy reservoirs are also pertinent factors in thermal energy storage capacity of a given reservoir. Moreover, at block 132, the controller 16 calculates the quantity of the thermal storage capacity of the thermal management system 12 that has been used. The controller 16 uses information regarding the quantity of thermal storage capacity used in the thermal management system 12 at block 120 to assist in calculating the heat deficit of the thermal management system 12. In addition, at block 132, the controller 16 calculates a percentage of overall thermal management system 12 thermal energy storage capacity that has been filled with thermal energy.

When the controller 16 determines that a drive unit 48 "heat" request has been made, the method 100 proceeds to block 118 where the thermal management system 12 operates as a heat pump to collect thermal energy from thermal energy sources and reservoirs within the thermal management system 12 and transfer the thermal energy to the drive unit 48. The thermal management method 100 then proceeds to blocks 118, 120, 122, and 124 or 126, then 112, 114, and subsequently back to block 102 as in example of the HVAC system 78 and battery 38 heat requests above. Referring once more to block 130, the drive unit 48 does not always make a request. Therefore, when no request is made, the thermal management method 100 proceeds to block 132 where the controller 16 commands the thermal management system 12 to store thermal energy in any of a variety of thermal energy reservoirs in the thermal management system 12. The thermal energy reservoirs can be any of the components of the coolant loop 24, the drive unit oil loop 62, or the refrigerant loop 52. In some aspects, the more mass that a thermal energy reservoir has, the more thermal energy the reservoir can store. However, the composition, density, surface area, insulation, and other physical characteristics of the thermal energy reservoirs are also pertinent factors in thermal energy storage capacity of a given reservoir. Moreover, at block 132, the controller 16 calculates the quantity of the thermal storage capacity of the thermal management system 12 that has been used. The controller 16 uses information regarding the quantity of thermal storage capacity used in the thermal management system 12 at block 120 to assist in calculating the heat deficit of the thermal management system 12. In addition, at block 132, the controller 16 calculates a percentage of overall thermal management system 12 thermal energy storage capacity that has been filled with thermal energy.

At block 134, the controller 16 determines whether the temperature of the coolant 28 is higher than a predetermined target temperature. The predetermined target temperature is selected as an indication of when the full storage capacity of the thermal management system 12 has been achieved. That is, when the thermal management system 12 is fully filled with thermal energy, the temperature of the coolant 28 will rise for each additional quantum of energy (thermal or otherwise) added to the thermal management system 12. If the thermal management system 12 is full, the method 100 proceeds to block 110 where the thermal management system 12 operates as heat pump to cool the components of the thermal management system 12. In several aspects, to cool the thermal management system 12, the controller 16 commands the thermal management system 12 to reject excess thermal energy to the passenger compartment or to the atmosphere surrounding the motor vehicle 10 via the radiator 54 and/or the exterior condenser 90 of the HVAC system 78, or other such heat exchangers. The thermal management method 100 then proceeds to blocks 112, 114, and subsequently to block 102 where the method 100 operates continuously. However, if the controller 16 determines that the thermal management system 12 is not full, the method 100 proceeds to block 112 where the controller 16 calculates a coolant 28 flow as a function of the quantity of thermal energy in the coolant 28, the battery 38, the HVAC system 78, and electronic heating apparatuses, such as wall chargers for the motor vehicle 10 and the like operated by the OBCM 36. At block 114, the thermal management method 100 exits and returns to block 102 where the continuous thermal management loop begins once more.

While the above described thermal management method 100 is described as having a series-wise set of calculations based on the HVAC system 78 request at block 108, the battery 38 request at block 128, and the drive unit 48 request at block 130 it should be understood that each of the calculations carried out in blocks 108, 128, and 130 may be carried out in series, in parallel, or out of the order given in FIG. 5 without departing from the scope or intent of the present disclosure.

A motor vehicle thermal management system 12 and method 100 for controlling the thermal management system 12 of a motor vehicle 10 of the present disclosure offers several advantages. These include low cost of production, simplified componentry, reduced size and cost of componentry, simplified computer and fluid control architecture, adaptability, increased fuel economy (or MPGe), improved safety, improved emissions, and applicability to a wide variety of motor vehicles 10 and drivetrain types. Additionally, the system and method of the present disclosure improve the reliability and robustness of thermal management for motor vehicle 10 systems by providing increased thermal energy storage redundancy and resiliency in preexisting motor vehicle 10 components.

A number of operating modes may be provided by way of the thermal energy management system 12, e.g., using the method 100 discussed above. Examples of available operating modes may include, but are not limited to, the modes discussed in further detail below.

In a first operating mode, the thermal energy management system 12 may generally store thermal energy developed by components of the vehicle 10. For example, where there is not an immediate demand by other components of vehicle 10, e.g., to supply heat to the passenger compartment using the HVAC system 78, excess thermal energy of the battery 38 may be stored. In this manner, a "low-quality" form of thermal energy may be stored within the thermal energy management system 12 for later use. In this manner, relatively low-quality thermal energy may be stored and accumulated to facilitate use of the thermal energy as relatively "high-quality" thermal energy at a later time, e.g., when demanded by other vehicle systems or components. In one example, e.g., as described above at block 104, the controller 16 may calculate a stored energy in the thermal management system 12. The stored quantity of thermal energy may be used upon demand by other vehicle systems, e.g., due to a demand for heat to be supplied to the passenger compartment.

In other example operating modes, the thermal energy management system 12 may generally cool the passenger compartment by circulating relatively cool air via the HVAC system 78.

For example, a second operating mode may include operation of HVAC system 78 to supply cool air to the passenger compartment. As noted above, at block 108 of the method 100, the controller 16 may determines that an HVAC system 78 request has been made to "cool" the passenger compartment. Accordingly, the thermal management system 12 may operate as a heat pump to cool the passenger compartment, e.g., as discussed above in connection with blocks 110 and 112. In this second mode, the thermal energy management system 12 may employ components of the refrigeration loop 52, e.g., the HVAC system 78, to generate substantially cooler airflows and transfer them into the passenger compartment.

Similarly, in a third mode, the HVAC system 78 may also supply cool air to the passenger compartment in response to a "cool" request using components of the refrigeration loop 52 to generate relatively cool airflows that are transferred into the passenger compartment. At the same time, in this third mode the thermal energy management system 12 may evacuate thermal energy from the battery 38 or other components in a power bay of the vehicle 10. For example, as noted above method 100 may in block 110 via the controller 16 operate the thermal management system 12 as a heat pump to cool the battery 38. The thermal management system 12 may thereby evacuate thermal energy from the battery 38, e.g., via the coolant 28, moving the thermal energy to other locations within the thermal management system 12 where the thermal energy is needed or evacuating from the vehicle entirely.

A fourth mode of the thermal energy management system may be identical to the third mode set forth above, but may include in addition a reheat function with respect to air conditioning or cooling being provided by the HVAC system 78. For example, the HVAC system 78 may dehumidify an airflow being supplied to the passenger compartment by further cooling the airflow, facilitating removal of moisture from the airflow.

Additional modes of the thermal energy management system 12 may be directed to situations where it is desired to remove thermal energy from a power bay of the vehicle 10. For example, a motor-generator (not specifically shown) associated with the battery 38 for providing propulsion to the vehicle 10, and/or the battery 38, may be segregated in a generally closed engine bay or compartment for purposes of isolating the noise, vibrations, heat, etc. associated with their operation from vehicle passengers. Accordingly, in these modes it may be desirable to reduce ambient temperature in the bay and/or of the components in the bay themselves.

In a fifth operating mode, for example, the thermal energy management system 12 is seeking to cool the power bay and/or components thereof, without a need to heat or cool the passenger compartment. For example, where no demand to heat or cool the passenger compartment has been made, and the operating temperature of components of the power bay, e.g., the battery 38, are above a desired temperature or range, the thermal energy management system 12 may evacuate thermal energy from the power bay in response.

In other operating modes involving a cooling of the power bay, the thermal energy management system 12 may additionally supply heat to the passenger compartment using the HVAC system 78. For example, the thermal energy management system 12 may provide an electronic thermal transfer heating function, where excess heat from the power bay or other vehicle components may be used to provide heat to the passenger compartment. In one such example involving a sixth operating mode, a quantity of heat from the power bay, e.g., from the battery 38, may be used to supply heat to the HVAC system 78 and also operate a defrost and/or defogging function with respect to the vehicle 10. In a further example directed to a seventh operating mode, a quantity of heat from vehicle component(s) in the power bay such as the battery 38 may supply heat to the HVAC system 78 to the exclusion of other heating methods available to the passenger compartment. Accordingly, the seventh operating mode may generally be a "maximum" heating mode with respect to supplying all available thermal energy to the passenger compartment. In each of the sixth and seventh operating modes, a heat request may be received at the HVAC system 78, such that the controller 16 operates the thermal management system 12 as a heat pump to heat the passenger compartment, e.g., as described above at block 118. The sixth and seventh modes may also include the determination of a heat deficit to determine the need for thermal energy to be provided, e.g., by the battery 38, to the thermal management system 12. Accordingly, thermal energy collected in the various example ways described above from circulating coolant 28 may be distributed to locations where the thermal energy is needed, i.e., the passenger compartment.

The example thermal energy management system 12 advantageously may transfer thermal energy amongst the three thermal fluid loops, as noted above. In this manner, excess thermal energy from thermal sources such as the vehicle battery 38 or other electronics may be used to sustain operation in extreme temperatures, even in cases where the thermal energy created is of relatively low-quality (e.g., generated from electronic sources). By contrast, in previous approaches to vehicle heating systems it would be necessary to purge a refrigeration loop or cease heating operations after a period of time in very cold ambient temperatures (e.g., at or below freezing, i.e., 32 degrees Fahrenheit or 0 degrees Celsius) due to the buildup of ice on refrigerant coils (i.e., a "freeze-purge" cycle). In other words, while previous approaches to vehicle heating systems typically require periodic shutdowns in freezing or sub-freezing temperatures, the example thermal energy management system 12 may draw thermal energy from other sources such as the vehicle battery 38 or other electronics, thereby sustaining operation for longer periods of time in extreme cold. In one illustrative example of this advantage of the thermal energy management system 12, the coolant loop 24 is configured to transfer thermal energy to the passenger compartment via the refrigerant loop 52, thereby heating the passenger compartment. Moreover, this heating of the passenger compartment may be supplied continuously at very cold temperatures (e.g., at or below 5 degrees Celsius) and without necessitating a freeze-purge cycle of the refrigerant loop 52.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A vehicle, comprising:
   a passenger compartment; and
   a thermal energy management system configured to supply thermal energy to the passenger compartment, the thermal energy management system including:
   a first thermal fluid loop including a coolant pump and a coolant conduit, the coolant pump being configured to pump a coolant through a vehicle battery, a transmission oil cooler of the vehicle, and a chiller via the coolant conduit, wherein the coolant, when circulated through the coolant conduit by the coolant pump, is configured to selectively transfer thermal energy from the vehicle battery, the transmission oil cooler, and the chiller;
   a second thermal fluid loop configured to circulate oil through the transmission oil cooler, the oil circulated about a drive unit of the vehicle to transfer thermal energy from the drive unit via the oil; and
   a third thermal fluid loop configured to circulate a refrigerant through the chiller and a condenser such that the third thermal fluid loop is configured to transfer thermal energy to the passenger compartment,
   wherein the first thermal fluid loop is configured to transfer thermal energy to the passenger compartment via the third thermal fluid loop to thereby continuously heat the passenger compartment without a freeze purge cycle of the chiller and the condenser in the third thermal fluid loop during operation of the thermal energy management system.

2. The vehicle of claim 1, wherein the vehicle further comprises at least one of an onboard charging module and an integrated power electronics module, and the first thermal fluid loop is configured to circulate the coolant through the at least one of the onboard charging module and the integrated power electronics module.

3. The vehicle of claim 2, wherein the first thermal fluid loop is configured to store thermal energy from the at least one of the onboard charging module and the integrated power electronics module.

4. The vehicle of claim 1, wherein the first thermal fluid loop is thermally connected to the third thermal fluid loop via the chiller, and wherein the first thermal fluid loop is configured to supply at least a portion of the thermal energy transferred from the vehicle battery, the transmission oil cooler, and the chiller to the passenger compartment via the chiller and the third thermal fluid loop.

5. The vehicle of claim 1, wherein the first thermal fluid loop is configured to supply thermal energy to the passenger compartment via the third thermal fluid loop without the freeze purge cycle of the third thermal fluid loop at an ambient temperature at or below 5 degrees Celsius.

6. The vehicle of claim 1, wherein the vehicle is configured to circulate thermal energy generated by the vehicle only via the first, second, and third thermal fluid loops.

7. The vehicle of claim 1, further comprising an electric motor-generator receiving electric power from the battery, the motor-generator configured to supply propulsion to the vehicle.

8. The vehicle of claim 7, wherein the vehicle is a battery electric vehicle (BEV), a hybrid vehicle, or a fuel cell vehicle.

9. The vehicle of claim 1, wherein the first thermal fluid loop is a coolant loop, the second thermal fluid loop is an oil loop, and the third thermal fluid loop is a refrigerant loop.

10. The vehicle of claim 1, further comprising an electric motor-generator receiving electric power from the battery, the motor-generator configured to supply propulsion to the vehicle, and wherein:
    the vehicle further comprises an onboard charging module and an integrated power electronics module;
    the first thermal fluid loop is configured to circulate the coolant through the onboard charging module and the integrated power electronics module;
    the first thermal fluid loop is configured to store thermal energy from the onboard charging module and the integrated power electronics module;

the first thermal fluid loop is configured to supply at least a portion of the stored thermal energy to the passenger compartment via the third thermal fluid loop;

the vehicle is configured to circulate thermal energy generated by the vehicle only via the first, second, and third thermal fluid loops; and the first thermal fluid loop is a coolant loop, the second thermal fluid loop is an oil loop, and the third thermal fluid loop is a refrigerant loop.

11. A thermal energy management system for a vehicle, the vehicle including a passenger compartment, the thermal energy management system comprising:

a first thermal fluid loop including a coolant pump and a coolant conduit, the coolant pump being configured to pump a coolant through a vehicle battery, a transmission oil cooler of the vehicle, and a chiller via the coolant conduit, wherein the coolant, when circulated through the coolant conduit by the coolant pump, is configured to selectively transfer thermal energy from the vehicle battery, the transmission oil cooler, and the chiller;

a second thermal fluid loop configured to circulate oil through the transmission oil cooler, the oil circulated about a drive unit of the vehicle to transfer thermal energy from the drive unit via the oil; and a third thermal fluid loop configured to circulate a refrigerant through the chiller and a condenser such that the third thermal fluid loop is configured to transfer thermal energy to the passenger compartment of the vehicle, wherein the first thermal fluid loop is configured to transfer thermal energy to the passenger compartment via the third thermal fluid loop to thereby continuously heat the passenger compartment without a freeze purge cycle of the chiller and the condenser in the third thermal fluid loop during operation of the thermal energy management system.

12. The thermal energy management system of claim 11, wherein the first thermal fluid loop is configured to circulate the coolant through at least one of an onboard charging module of the vehicle and an integrated power electronics module of the vehicle.

13. The thermal energy management system of claim 12, wherein the first thermal fluid loop is configured to store thermal energy from the at least one of the onboard charging module and the integrated power electronics module.

14. The thermal energy management system of claim 11, wherein the first thermal fluid loop is thermally connected to the third thermal fluid loop via the chiller, and wherein the first thermal fluid loop is configured to supply at least a portion of the thermal energy transferred from the vehicle battery, the transmission oil cooler, and the chiller to the passenger compartment via the chiller and the third thermal fluid loop.

15. The thermal energy management system of claim 11, wherein the first thermal fluid loop is configured to supply thermal energy to the passenger compartment via the third thermal fluid loop without the freeze purge cycle of the third thermal fluid loop at an ambient temperature at or below 5 degrees Celsius.

16. A thermal energy management system for a vehicle, the thermal energy management system comprising:

a coolant loop including a coolant pump and a coolant conduit, the coolant pump being configured to circulate a coolant through a vehicle battery, a transmission oil cooler of the vehicle, and a chiller via the coolant conduit, wherein the coolant, when circulated through the coolant loop by the coolant pump, is configured to selectively transfer thermal energy from the vehicle battery, the transmission oil cooler, and the chiller;

an oil loop configured to circulate oil through the transmission oil cooler, the oil circulated about a drive unit of the vehicle to transfer thermal energy from the drive unit via the oil; and a refrigerant loop configured to circulate a refrigerant through the chiller and a condenser such that the third thermal fluid loop is configured to transfer thermal energy to a passenger compartment of the vehicle, wherein the coolant loop is configured to transfer thermal energy to the passenger compartment via the refrigerant loop to thereby continuously heat the passenger compartment without a freeze purge cycle of the refrigerant loop, including the chiller and the condenser, during operation of the thermal energy management system.

17. The thermal energy management system of claim 16, wherein the coolant loop is configured to circulate the coolant through at least one of an onboard charging module of the vehicle and an integrated power electronics module of the vehicle.

18. The thermal energy management system of claim 17, wherein the coolant loop is configured to store thermal energy from the at least one of the onboard charging module and the integrated power electronics module.

19. The thermal energy management system of claim 18, wherein the coolant loop is configured to supply at least a portion of the stored thermal energy to the passenger compartment via the refrigerant loop.

20. The thermal energy management system of claim 18, wherein the coolant loop supplies thermal energy transferred from the vehicle battery, the transmission oil cooler, and the chiller to the passenger compartment via the refrigerant loop without the freeze purge cycle of the refrigerant loop at an ambient temperature at or below 5 degrees Celsius.

* * * * *